(12) United States Patent
Tillmann et al.

(10) Patent No.: US 12,291,544 B2
(45) Date of Patent: May 6, 2025

(54) PROCESS FOR PREPARING TRIMETHYLCHLOROSILANE

(71) Applicant: Wacker Chemie AG, Munich (DE)

(72) Inventors: Jan Tillmann, Munich (DE); Richard Weidner, Burghausen (DE)

(73) Assignee: Wacker Chemie AG, Munich (DE)

( * ) Notice: Subject to any disclaimer, the term of this patent is extended or adjusted under 35 U.S.C. 154(b) by 240 days.

(21) Appl. No.: 17/780,559

(22) PCT Filed: Dec. 4, 2019

(86) PCT No.: PCT/EP2019/083663
§ 371 (c)(1),
(2) Date: May 27, 2022

(87) PCT Pub. No.: WO2021/110256
PCT Pub. Date: Jun. 10, 2021

(65) Prior Publication Data
US 2022/0411444 A1   Dec. 29, 2022

(51) Int. Cl.
*C07F 7/12*   (2006.01)
(52) U.S. Cl.
CPC .................. *C07F 7/125* (2013.01)
(58) Field of Classification Search
CPC ........... C07F 7/0896; C07F 7/125; C07F 7/12
See application file for complete search history.

(56) References Cited

U.S. PATENT DOCUMENTS

| | | | |
|---|---|---|---|
| 3,207,699 A | 9/1965 | Harding et al. | |
| 3,346,349 A | 10/1967 | Harding et al. | |
| 3,384,652 A | 5/1968 | Hamilton | |
| 4,889,838 A * | 12/1989 | Lewis | C07F 7/125 423/342 |
| 5,493,043 A | 2/1996 | Marko | |

FOREIGN PATENT DOCUMENTS

| | | | |
|---|---|---|---|
| CN | 103691458 A * | 4/2014 | ................ C07F 7/12 |
| EP | 0147834 A1 | 7/1985 | |
| EP | 0219718 A1 | 4/1987 | |
| KR | 20150106005 A | 9/2015 | |

OTHER PUBLICATIONS

Jiangxi (CN103691458 A; Machine English translation done on May 1, 2024).*
Stephen Brunauer, P. H. Emmett, and Edward Teller: "Adsorption of Gases in Multimolecular Layers", Journal of the American Chemical Society, 1938, 60, 2, p. 309-319.

* cited by examiner

*Primary Examiner* — Pancham Bakshi

(57) ABSTRACT

A process for preparing trimethylchlorosilane (M3) and methyltrichlorosilane (M1) by disproportionation of dimethyldichlorosilane (M2) in the presence of an $Al_2O_3$ catalyst is described herein. The dimethyldichlorosilane used is in the form of a silane mixture that includes 80-100% by weight of dimethyldichlorosilane (M2). The difference in content from 100% by weight includes M1 and M3.

8 Claims, No Drawings

PROCESS FOR PREPARING TRIMETHYLCHLOROSILANE

CROSS-REFERENCE TO RELATED APPLICATION

This application is a U.S. National Phase Application of PCT/EP2019/083663, filed Dec. 4, 2019, the contents of which are hereby incorporated by reference in their entirety.

BACKGROUND

The present invention relates to a process for preparing trimethylchlorosilane (M3) and methyltrichlorosilane (M1) by disproportionation of dimethyldichlorosilane (M2) in the presence of an $Al_2O_3$ catalyst, the dimethyldichlorosilane being used in the form of a silane mixture that comprises 80-100% by weight of dimethyldichlorosilane (M2), and wherein the difference in content from 100% by weight comprises M1 and M3.

Trimethylchlorosilane (M3) is an industrially important raw material used for example in the production of silicones, for hydrophobizing and in organic synthesis.

The amount of M3 available industrially is however limited. It is formed e.g. as a by-product in the Müer-Rochow process or it can be obtained from tetramethylsilane (TMS)—likewise a by-product of the Müller-Rochow process. The silane mixture formed in the Müller-Rochow process comprises the main product dimethyldichlorosilane (M2) in concentrations of 70% by weight to 90% by weight, but also methyltrichlorosilane (M1), trimethylchlorosilane (M3), dimethyltetrachlorodisilane and other silanes. These must be separated by rectification.

A number of processes for the disproportionation of M2 to M3 and M1 have already been described in the literature.

EP0219718A1 discloses in this regard the disproportionation of M2 to M3 and M1 using a catalyst complex of $AlX_3$ and $CuX_n$, where X is a halogen atom and n is 1 or 2. More specifically, in examples 2 and 3 a number of experiments are carried out in which $(CH_3)_2SiCl_2$ is reacted in the presence of $CuCl/AlCl_3$ for 5 hours at temperatures within a range of 264-300° C. in an autoclave at pressures of between 34.5-37.95 bar. Both the $CuCl/AlCl_3$ molar ratio and the temperature are varied.

In this way, in example 3, a maximum of 8.19% by weight of M3 is obtained, in one instance at a temperature of 323° C., 5.05% by weight of $AlCl_3$ and a $CuCl/AlCl_3$ molar ratio of 0.26 and in another instance at a temperature of 322° C., 5.05% by weight of $AlCl_3$ and a $CuCl/AlCl_3$ molar ratio of 0.5. However, these conditions also resulted in the production respectively of 17.03% by weight and 17.99% by weight of M1. The M3 content of 8.19% by weight should correspond to 85% of the potential thermodynamic equilibrium in relation to M3.

A fundamentally negative point about the disclosed process is that a continuous process would not be possible, because $AlCl_3$ sublimes at approx. 180° C. and would therefore be carried out of the reactor. The suprastoichiometric proportion of M1 in the product mixture moreover indicates that decomposition of methylchlorosilane must have occurred, i.e. that unfavourable side reactions are taking place. The described process is thus not suitable for producing M3 in industrially relevant amounts.

U.S. Pat. No. 3,384,652 discloses disproportionation reactions of organo(chloro)silanes in the presence of crystalline aluminosilicate catalysts (zeolites). Disclosed inter alia is the disproportionation of dimethyldichlorosilane (M2) to trimethylchlorosilane (M3) and methyltrichlorosilane (M1) on hydrogen zeolite Y under reflux conditions, in which 25% M3, 22% M1, 5% $SiCl_4$ and 8% TMS are obtained. Also present in the product mixture is 40% of M2 that has not reacted. The amounts of M3 and M1 obtained and the formation of $SiCl_4$ and TMS do however contradict the thermodynamics of the disproportionation reaction.

Also known from the literature are processes for the enrichment of trimethylchlorosilane (M3) in low-boiling silane mixtures (from the Müller-Rochow process).

EP0147834A1 discloses a continuous process for the disproportionation of an individual silane of the general formula $R_nSiX_{4-n}$, where R—H, phenyl or $C_1$-$C_5$ alkyl; X=halogen and n=1, 2 or 3, wherein the corresponding silane is contacted with an activated crystalline y-aluminium oxide catalyst or η-aluminium oxide catalyst at a temperature of 200-450° C. for a maximum of 10 minutes, activated meaning that the catalyst had been treated beforehand (a) for 0.5 to 2 hours at 500-600° C., or (b) under reduced pressure at 400-500° C., or (c) with reactive gases such as HF or HCl. More specifically, in example 1 a number of experiments are carried out in which the low-boiling fraction from the Müller-Rochow process is enriched with M2 (initial composition: M2=50.4%, TMS=35.8%) and is reacted in a tubular reactor in the presence of (γ-$Al_2O_3$ SA-6173, 3.2 mm extrudates, activated for 0.5 hours at 400° C.). Both the temperature and the flow rate are varied, the reaction is carried out unpressurized. In this way, M3 contents of between 58.0-68.3% are obtained at temperatures of 300 or 400° C. and a flow rate of between 0.27-1.07 ml/min.

Example 2: Initial content M2=51.7% and TMS=38.7%, catalyst A (γ-$Al_2O_3$ SA-6173, 3.2 mm extrudates, activated for 0.5 hours at 400° C.), 0-2.4 bar pressure, 200-400° C., flow rate 0.29-1.17 ml/min. M3 contents of between 30.2-72.9% are achieved.

Example 3: Initial content M2=36.5% and TMS=23.2%, catalyst A (γ-$Al_2O_3$ SA-6173, 1.6 mm extrudates, activated for 0.5 hours at 400° C.), 400° C. reaction temperature, activated at 400° C. for 0.5 hours, 0.138 bar, 44.2-44.4% M3 with a contact time of 34.5-38.7 seconds.

The high yields of M3 in the two examples are a consequence of the high content of TMS in the starting mixture.

U.S. Pat. No. 5,493,043 discloses a process for enriching a low-boiling methylsilane mixture with dimethylhydrochlorosilane or trimethylchlorosilane (M3) in the presence of an aluminium oxide catalyst above 150° C. The methylsilane mixture originates from the distillate of the Müller-Rochow synthesis. In order to enrich M3 in the mixture, at least tetramethylsilane (TMS) and dimethyldichlorosilane (M2) needed to be present in the mixture and the temperature in the process needed to be within the range 180-304° C.

Activated aluminium-containing catalysts in reactions of organosilanes are also described.

U.S. Pat. No. 3,207,699 discloses catalysts impregnated with trimethylsilyl groups for the rearrangement of trimethylsilane. In example VI, an η—$Al_2O_3$ catalyst is wetted and impregnated with trimethylsilane at 510° C.

U.S. Pat. No. 3,346,349 discloses synthetic silica-alumina catalysts activated with organosilanes or halosilanes of the formula $R_1R_nSiX_{(3-n)}$, where $R_n$ and $R_1$ are hydrogen or a $C_1$-$C_5$ alkyl group, X is a halogen and n an integer from 0 to 3. The catalysts are used for preparing dimethyldichlorosilane from methylated chlorosilanes.

In order to cover industrial needs for this raw material, there is thus additionally a need for a simple process for preparing M3 in which the content of M3 is close to the thermodynamic maximum.

BRIEF SUMMARY

Embodiments of a process for preparing trimethylchlorosilane are described below. In an embodiment, the process is for preparing trimethylchlorosilane (M3) and methyltrichlorosilane (M1) by disproportionation of dimethyldichlorosilane (M2) in the presence of an $Al_2O_3$ catalyst. In this embodiment, the dimethyldichlorosilane being used is in the form of a silane mixture that comprises 80-100% by weight of dimethyldichlorosilane (M2), wherein the difference in content from 100% by weight comprises M1 and M3.

DETAILED DESCRIPTION

This object is achieved by the process of the invention.

The process of the invention provides very good yields of M3 that are close to the thermodynamic maximum. Moreover, M1 is formed in stoichiometric amounts, which indicates that no side reactions or decomposition reactions occur.

The present invention provides a process for preparing trimethylchlorosilane by disproportionation of dimethyldichlorosilane (M2) in the presence of an $Al_2O_3$ catalyst, the dimethyldichlorosilane being used in the form of a silane mixture that comprises at least 80% by weight of dimethyldichlorosilane (M2), and wherein the difference in content from 100% by weight comprises M1 and M3.

Silane disproportionation—strictly speaking this should be termed dismutation—means that an individual silane rearranges to two or more different silanes (e.g. M2->M3+M1), wherein the substituents in the silanes formed (e.g. Cl and $CH_3$) have a substitution pattern different to that of the original silane. A silane disproportionation reaction can for example be illustrated by formula (I) below:

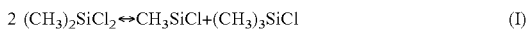

$$2\ (CH_3)_2SiCl_2 \leftrightarrow CH_3SiCl_3 + (CH_3)_3SiCl \qquad (I)$$

The position of the thermodynamic equilibrium in this disproportionation of dimethyldichlorosilane is normally at high concentrations of dimethyldichlorosilane. In the absence of a catalyst, the disproportionation reaction occurs very slowly or not at all; with the catalysts and conditions of the prior art, the reaction is likewise still too slow or does not achieve the thermodynamically possible yield of M3.

M2 is used in the form of a silane mixture that comprises 80-100% by weight of dimethyldichlorosilane (M2), and wherein the difference in content from 100% by weight comprises M1 and M3.

The silane mixture preferably comprises 98-100% by weight of M2, most preferably the silane mixture comprises 99.5-100% by weight of M2. The difference in content preferably exclusively comprises M1.

The $Al_2O_3$ catalyst is preferably activated prior to the disproportionation by passing (i) $SiCl_4$, or
(ii) HCl gas; or
(iii) a mixture of HCl gas and at least one chlorosilane of the formula (II)

$$R_xSiCl_{4-x} \qquad (II),$$

where the radicals R are independently selected from the group consisting of (i) hydrogen and (ii) $C_1$-$C_5$ alkyl radical, and the index x has the values 0, 1, 2 or 3, over the catalyst at a temperature within a range from 330° C. to 550° C.

The radicals R in the formula (II) are preferably independently selected from methyl radical or hydrogen.

Examples of chlorosilanes of the formula (II) are $Me_2SiCl_2$, $Me_3SiCl$, $MeSiCl_3$, $Me_2ClSiH$, $Cl_3SiH$, $SiCl_4$.

The $Al_2O_3$ catalyst is particularly preferably activated prior to the disproportionation by passing HCl gas over the catalyst.

The contact time in the activation is normally 1-100 seconds.

Preference is given to using an $Al_2O_3$ catalyst having a BET surface area within a range of 100-200 $m^2/g$, more preferably within a range of 150-180 $m^2/g$. The BET specific surface area is the specific surface area determined by adsorption of nitrogen in accordance with standard ASTM D 3663-78, which is based on the Brunnauer-Emmet-Teller method (J. Am. Chem. Soc. 1938, 60, 309-319).

The $Al_2O_3$ catalyst used preferably has a pore volume within a range of 0.1-1 $cm^3/g$, more preferably within a range of 0.4-0.5 $cm^3/g$.

The pore volume can be determined for example by mercury porosimetry.

The $Al_2O_3$ catalyst may contain up to 20% by weight of other elements, e.g. carbon, or smaller amounts of silicon and/or chlorine. For example, residues of auxiliary substances used for shaping may thus be present.

The $Al_2O_3$ catalyst is normally present in the form of a shaped body. Examples of shaped bodies are tablets, granules, spheres, rings, cylinders, hollow cylinders.

The shaped bodies preferably have a size within a range of 1-10 mm, more preferably within a range of 2-4 mm.

Particular preference is given to using a $\gamma$-$Al_2O_3$ catalyst. Most preferably, a $\gamma$-$Al_2O_3$ catalyst in the form of a shaped body having a BET surface area within a range of 100-200 $m^2/g$, a pore volume within a range of 0.1-1 $cm^3/g$ and a size within a range of 1-10 mm is used.

The process of the invention is particularly preferably executed at a temperature within a range from 390° C. to 490° C. and a pressure of less than 1 bar.

The process may be executed continuously or batchwise, with a continuous process being preferable. With the continuous operation of the process, M2 can be separated from the product mixture by distillation and fed back into the process.

The contact time for the silane mixture is normally within a range of 0.1-120 seconds, preferably within a range of 1-30 seconds, more preferably the contact time is within a range of 10-15 seconds.

At the end of the reaction, the trimethylchlorosilane can be separated from the reaction mixture, e.g. by distillation.

EXAMPLES

The experiments were carried out in a tubular reactor filled with $Al_2O_3$ (Al 3438 T ⅛" pellets, BASF). The reactor was heated with a heating jacket; the heating zone filled with catalyst had a height of approx. 30 cm and a diameter of 5 cm. The M2 was first vaporized and preheated before it was able to come into contact with the catalyst. The product mixture was condensed and collected by means of a reflux condenser.

GC measurements were performed using an Agilent 6890N (WLD detector; columns: HP5 from Agilent: length: 30 m/diameter: 0.32 mm/film thickness: 0.25 μm; RTX-200 from Restek: length: 60 m/diameter: 0.32 mm/film thickness: 1 μm). Retention times were compared with the commercially available substances, all chemicals were used as purchased. All values are in percent by weight.

Example 1

The catalyst was activated with vaporized SiCl₄ at 450° C. (internal measurement in the centre of the bed). 150 mL of vaporized M2 was pumped through the catalyst bed at a reactor internal temperature of 378° C. and with a contact time in the reactor of ~20 s, and the condensed product mixture was analysed.

The product mixture consisted of 76.9% by weight of M2, 13.3% by weight of M1 and 9.6% by weight of M3. Small amounts of unidentified by-products were present.

Example 2

With the same catalyst load as in example 1, 150 mL of vaporized M2 was pumped through the catalyst bed at a reactor internal temperature of 377° C. and with a contact time in the reactor of ~30 s, and the condensed product mixture was analysed.

The product mixture consisted of 74.1% by weight of M2, 15.4% by weight of M1 and 10.2% by weight of M3. Small amounts of unidentified by-products were present.

Example 3:

With the same catalyst load as in example 1, 150 mL of vaporized M2 was pumped through the catalyst bed at a reactor internal temperature of 485° C. and with a contact time in the reactor of ~7 s, and the condensed product mixture was analysed.

The product mixture consisted of 75.1% by weight of M2, 14.2% by weight of M1 and 10.7% by weight of M3. Small amounts of unidentified by-products were present.

Example 4

The catalyst was activated with HCl gas at 450° C. (internal measurement in the centre of the bed). 150 mL of vaporized M2 was pumped through the catalyst bed at a reactor internal temperature of 390° C. and with a contact time in the reactor of ~25 s, and the condensed product mixture was analysed.

The product mixture consisted of 77.9% by weight of M2, 12.8% by weight of M1 and 9.3% of M3. Small amounts of unidentified by-products were present.

Example 5

The catalyst was activated with a mixture of HCl gas and vaporized SiCl₄ at 450° C. (internal measurement in the centre of the bed). 150 mL of vaporized M2 was pumped through the catalyst bed at a reactor internal temperature of 400° C. and with a contact time in the reactor of ~18 s, and the condensed product mixture was analysed. The product mixture consisted of 78.0% by weight of M2, 12.6% by weight of M1 and 9.4% by weight of M3. Small amounts of unidentified by-products were present.

Example 6

20 g of catalyst (activated beforehand with HCl) and 150 mL of M2 were heated to 350° C. for 3 hours in a closed autoclave. After cooling, the autoclave was opened and the contents analysed.

The product mixture consisted of 76.8% by weight of M2, 14.1% by weight of M1 and 9.1% by weight of M3. Small amounts of unidentified by-products were present.

Comparative Example 1

With an unactivated catalyst load, 150 mL of vaporized M2 was pumped through the catalyst bed at a reactor internal temperature of 350° C. and with a contact time in the reactor of ~60 s, and the condensed product mixture was analysed.

The product mixture consisted of 68.3% by weight of M2, 14.4% by weight of M1 and 7.7% by weight of M3. Also present was a further 8.4% by weight of partially chlorinated methylated disiloxanes that cannot be used further.

The examples show that both the yield of M3 and the amount of M1 formed are much better than the values achieved in the prior art. They also correspond to the thermodynamic equilibrium cited in EP0219718.

The invention claimed is:

1. Process for preparing trimethylchlorosilane (M3) and methyltrichlorosilane (M1) by disproportionation of dimethyldichlorosilane (M2) in the presence of an $Al_2O_3$ catalyst, wherein the $Al_2O_3$ catalyst utilized has a BET surface area within a range of 100-200 m²/g, the dimethyldichlorosilane being used is in the form of a silane mixture that comprises 80-100% by weight of dimethyldichlorosilane (M2), and wherein the difference in content from 100% by weight comprises M1 and M3.

2. The process according to claim 1, wherein the catalyst is activated prior to the disproportionation by passing
   (i) SiCl₄, or
   (ii) HCl gas; or
   (iii) a mixture of HCl gas and at least one chlorosilane of the formula (II)

$$R_xSiCl_{4-x} \qquad (II),$$

where the radicals R are independently selected from the group consisting of (i)
   hydrogen and (ii) $C_1$-$C_5$ alkyl radical, and the index x has the values 0, 1, 2 or 3, over the catalyst at a temperature within a range from 330° C. to 550° C.

3. The process according to claim 2, wherein the chlorosilane is M2 or SiCl₄.

4. The process according to claim 2, wherein the catalyst is activated prior to the disproportionation by passing HCl gas over the catalyst.

5. The process according to claim 1, wherein an $Al_2O_3$ catalyst having a pore volume within a range of 0.1-1 cm³/g is used.

6. The process according to claim 1, wherein a γ-$Al_2O_3$ catalyst is used.

7. The process according to claim 1, wherein the silane mixture comprises 98-100% by weight of M2.

8. The process according to claim 1, wherein the process is executed continuously.

* * * * *